(No Model.) 4 Sheets—Sheet 1.

W. H. LACKEY.
PORTABLE BOOK CASE, &c.

No. 315,301. Patented Apr. 7, 1885.

Witnesses:
T. C. Brecht
G. A. Kagler

Inventor:
W. H. Lackey
By E. W. Ginsabaugh
Attorney.

(No Model.)  
4 Sheets—Sheet 2.
W. H. LACKEY.
PORTABLE BOOK CASE, &c.
No. 315,301. Patented Apr. 7, 1885.
Fig. 5.
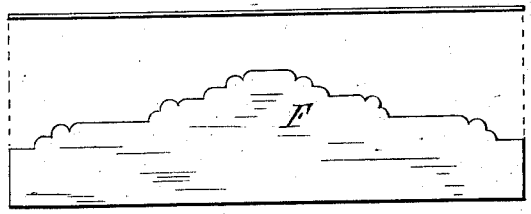
Fig. 6.
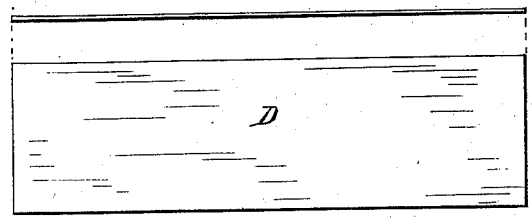
Fig. 7.
Fig. 8.
Fig. 9.
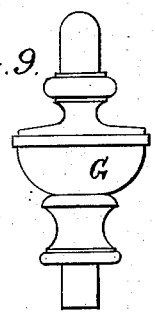
Fig. 10.
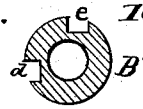
Fig. 11.
Witnesses:  
T. E. Brecht  
G. W. Rafer
Inventor.  
W. H. Lackey  
By L. W. Ginsabaugh  
Attorney (No Model.) 4 Sheets—Sheet 4.
W. H. LACKEY.
PORTABLE BOOK CASE, &c.
No. 315,301. Patented Apr. 7, 1885.
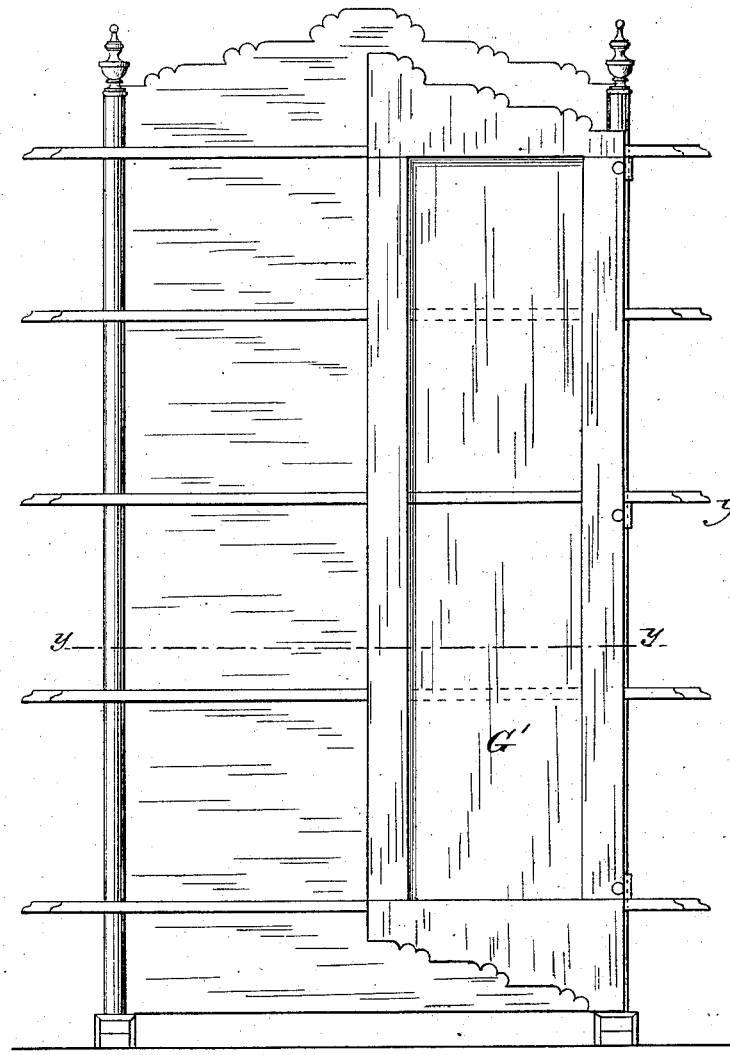
Fig. 13.
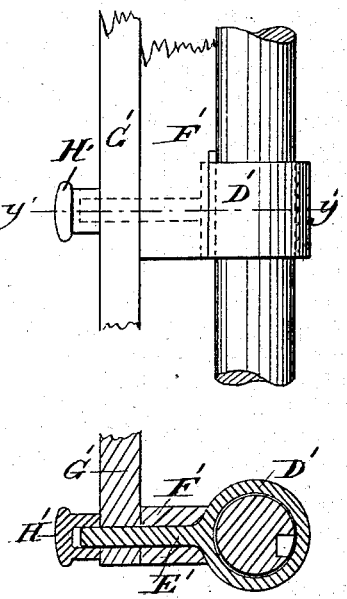
Fig. 15.
Fig. 16.
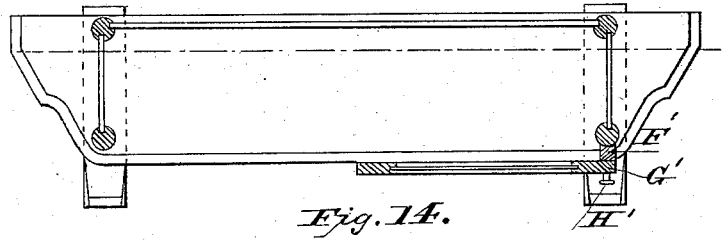
Fig. 14.
Witnesses:
T. C. Brecht
G. S. Rafter
Inventor:
W H Lackey
By L. W. Ginsabaugh
Attorney.

UNITED STATES PATENT OFFICE.

WILLIAM H. LACKEY, OF AKRON, OHIO.

PORTABLE BOOK-CASE, &c.

SPECIFICATION forming part of Letters Patent No. 315,301, dated April 7, 1885.

Application filed June 9, 1884. (No model.)

*To all whom it may concern:*

Be it known that I, WILLIAM H. LACKEY, a citizen of the United States, residing at Akron, in the county of Summit and State of Ohio, have invented certain new and useful Improvements in Portable Book-Cases, of which the following is a specification, reference being had therein to the acccompanying drawings.

My invention relates to portable book-cases, "what-nots," and other like articles of furniture.

The object of my invention is to provide a book-case, what-not, or other similar article of furniture having shelves which can be readily taken apart for transportation from place to place, and can be readily put together again when desired.

My invention consists of a series of posts or standards mounted or secured in a suitable base, said posts being provided with one or more longitudinal grooves for the reception of the back and side boards, the shelf-boards being adapted to fit over or onto the posts or standards and be separated and supported by the back and side boards.

My invention consists, further, in the devices for hanging the doors to the posts of the book-case, by which they can be readily hung in position, and in certain other details of construction, which will be more fully hereinafter described, and pointed out in the claims.

Figure 1:
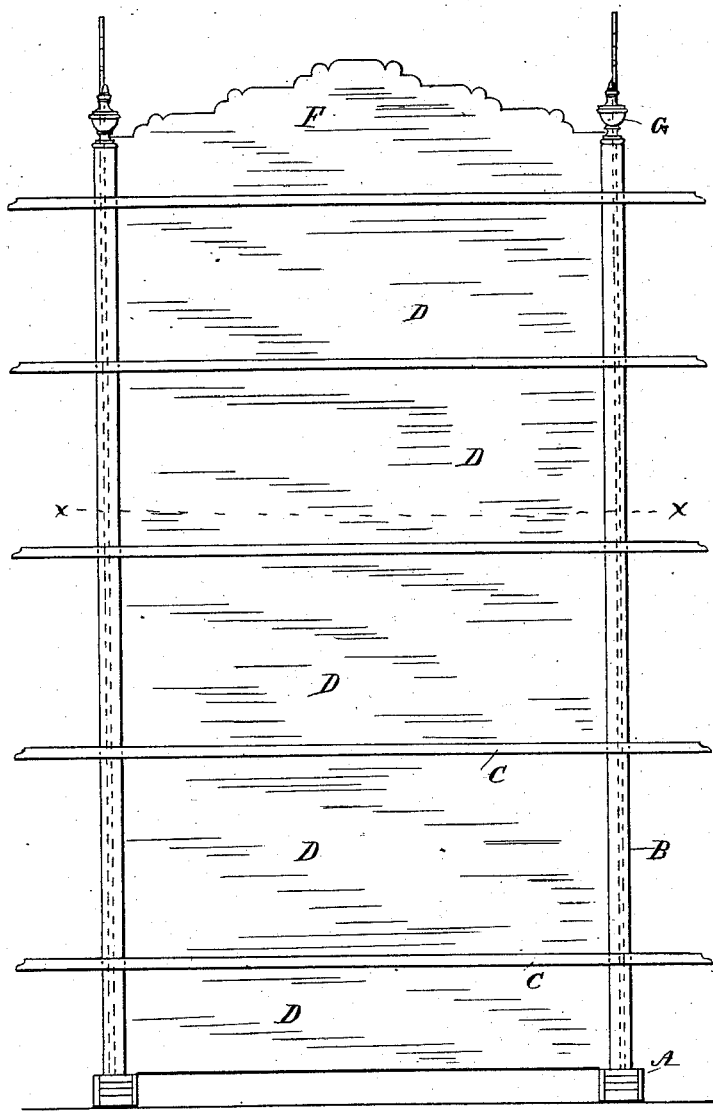
Figure 2:
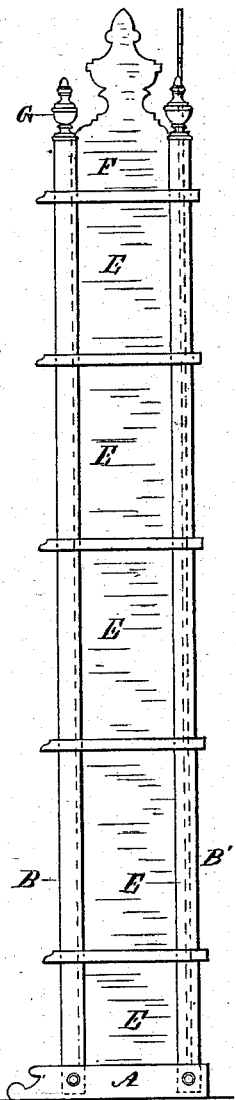
Figure 3:
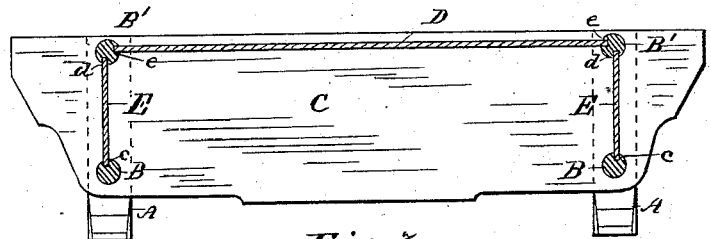
Figure 4:
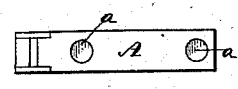
Figure 12:
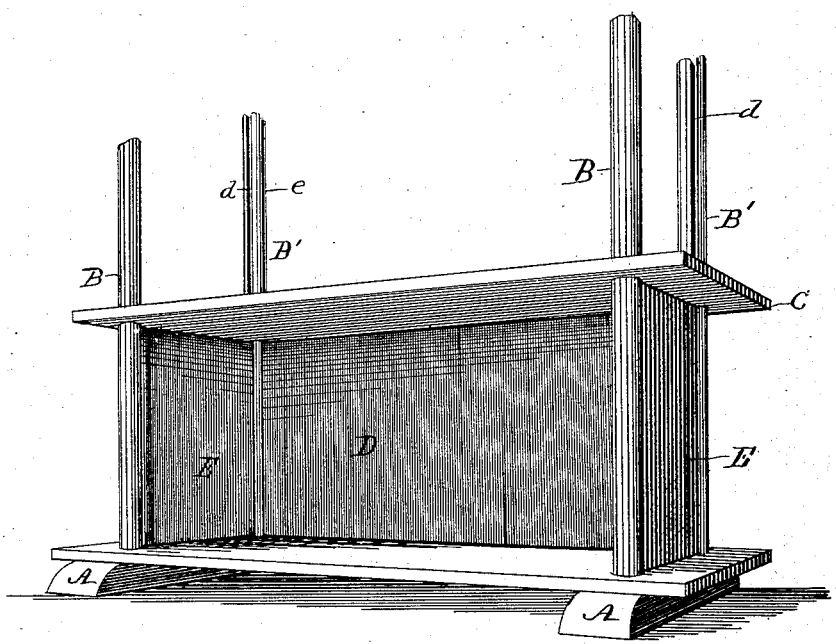

Figure 1 is a front elevation. Fig. 2 is a side elevation. Fig. 3 is a top view on the line $x\ x$ of Fig. 1. Fig. 4 is a top view of a foot or sill piece. Fig. 5 is a side and edge view of the top back panel. Fig. 6 is a side and edge view of the plain back panel. Fig. 7 is a side and edge view of top side panel. Fig. 8 is a side and edge view of a plain side panel. Fig. 9 is a side view of the top or ornamental section of one of the posts. Fig. 10 is a top view of the post. Fig. 11 is a side elevation of one of the posts or standards. Fig. 12 is a view in perspective of a portion of a book-case. Fig. 13 is a front view of a book-case, showing one of the doors attached. Fig. 14 is a horizontal sectional view on the line $y\ y$ of Fig. 13. Fig. 15 is a fragmentary view of the door and post, showing the hinge-connection and filling-block between the door and post. Fig. 16 is a horizontal sectional view on the line $y'\ y'$ of Fig. 15.

A A are the sills or foot-pieces, made of suitable size, and provided with holes or mortises $a$, for receiving the lower ends of the posts or standards B B', said standards being secured in the sills by means of pins or bolts $b$.

The base, instead of being made of the sills A A, may be made of one piece of heavy timber; but whether made of one piece or several pieces, it is desirable to have the back portion chamfered off, so the structure reared thereon will fit snugly against the wall of the apartment.

B B are the front and B' B' the rear standards or supports, firmly secured in the base or sills, as heretofore described. The front posts are provided with a groove, $c$, running their entire length, and when in position the groove in these posts faces toward the rear of the structure. The rear posts, B' B', are provided with two grooves, $d$ and $e$, at right angles to each other throughout their entire length, and when said posts are in position in the base-plate, the groove $d$ faces to the front and the groove $e$ inward or toward the other rear post B'. (See Fig. 3.)

C are the shelves, provided with apertures through which the standards pass.

D D are the back panels, and E the side panels, the upper panel of each being cut with scrolls or other fancy ornamentation, as may be desired, and as shown at F.

The parts, having been properly formed, as above indicated, are put together in the following manner: The lower ends of the posts or standards B B B' B' are secured in the holes or mortises in the sills or base-plate A, as before described. The side panels, E E, one at each side, are then slipped down the grooves $c\ d$, and one section of the back D slipped down in the grooves $e\ e$ in the standards B' B'. One of the shelves C is now slipped over the standards B B B' B' and slid down until it rests on the upper edge of the side and back panels, E and D. Other side and back panels are placed in the grooves in the standards, then another shelf, and so on until the entire case is built up, when the ornamental sections F are put on and the ornamental knobs G of the posts or standards are placed in position.

In Fig. 13 I have shown a book-case provided with doors, the devices for securing said doors to the posts being shown in Figs. 15 and 16, which I will now proceed to describe.

D' is an eyebolt the eye of which is made sufficiently large to slip down snugly over the posts or standards B, the bolt portion E' being made long enough to pass through the filling-piece F' and door G', in which position it is secured by a nut, H'.

The filling-piece is designed to fill the space between the posts or standards and the outer edges of the shelves, the rear edges of which are hollowed out or guttered to conform to the shape of the post, so that when the door is opened the filling-piece will slide with the eyebolt around the standard or post, and thus form a cheap and effective means for holding the doors in position.

The loop of the eyebolt D' may be made in sections hinged together, so that it can be clasped around the post or standard and secured by a thumb-screw, so that the doors can be hung after the case is put up.

The device just described I consider a modification, and comes within the spirit of my invention.

It will be noticed that the ends of the shelves extend beyond the sides of the book-case proper, and that such projecting ends can be used for a what-not, while the entire device can be taken apart without any trouble and readily transported from place to place. It will be further noticed that by putting in side and back panels of different widths or brackets at different points, the spaces between the shelves can be varied for the reception of books of different sizes.

Having thus described my invention, what I claim, and desire to secure by Letters Patent, is—

1. A book-case or what-not, composed of a base, longitudinally-grooved upright posts or standards secured to the base, with shelves provided with apertures to receive the upright posts, and back and side panels between the shelves, held in the longitudinal grooves in the standards, substantially as set forth.

2. The combination, in a portable book-case, with the upright posts detachably secured to sills or a base, of the eyebolts fitting over said posts, the doors secured to said eyebolts, and the intervening filling-pieces, as and for the purposes specified.

3. A book-case and what-not combined, the same consisting of a series of perforated shelves fitting over a series of upright posts, and a series of inclosing side and end pieces, the shelves protruding at each side and beyond the end panels to form a what-not, substantially as specified.

In testimony whereof I affix my signature in presence of two witnesses.

WILLIAM H. LACKEY.

Witnesses:
T. J. HENEGAN,
J. E. LACKEY.